(12) United States Patent
Lev et al.

(10) Patent No.: US 11,317,764 B2
(45) Date of Patent: May 3, 2022

(54) ELECTRIC COOKING UTENSILS

(71) Applicants: Amaya Sophia Lev, Peoria, AZ (US);
Arianna Beth Lev, Peoria, AZ (US)

(72) Inventors: Amaya Sophia Lev, Peoria, AZ (US);
Arianna Beth Lev, Peoria, AZ (US)

( * ) Notice: Subject to any disclaimer, the term of this patent is extended or adjusted under 35 U.S.C. 154(b) by 0 days.

(21) Appl. No.: 17/145,454

(22) Filed: Jan. 11, 2021

(65) Prior Publication Data
US 2022/0079386 A1 Mar. 17, 2022

Related U.S. Application Data

(60) Provisional application No. 63/079,519, filed on Sep. 17, 2020.

(51) Int. Cl.
*A47J 43/28* (2006.01)
*A47J 37/10* (2006.01)

(52) U.S. Cl.
CPC .......... *A47J 43/288* (2013.01); *A47J 37/108* (2013.01)

(58) Field of Classification Search
CPC ........ A47J 43/288; A47J 37/108; A21B 3/003
USPC ........................................ 294/7, 8
See application file for complete search history.

(56) References Cited

U.S. PATENT DOCUMENTS

| 3,146,339 | A | * | 8/1964 | Jepson | H01H 37/043 |
| | | | | | 219/442 |
| 3,196,253 | A | * | 7/1965 | Jepson | A47J 37/105 |
| | | | | | 219/436 |
| 3,678,844 | A | * | 7/1972 | Marshall | A47J 37/0676 |
| | | | | | 99/425 |
| 3,927,610 | A | * | 12/1975 | Minsky | A47J 37/10 |
| | | | | | 99/425 |
| 5,780,817 | A | * | 7/1998 | Eckman | F24C 7/067 |
| | | | | | 219/460.1 |
| 10,187,929 | B1 | * | 1/2019 | McFadden | H05B 3/06 |
| 2006/0163242 | A1 | * | 7/2006 | Ciancimino | A47J 37/0694 |
| | | | | | 219/450.1 |
| 2009/0070947 | A1 | * | 3/2009 | Baertschi | B26B 19/388 |
| | | | | | 30/526 |
| 2012/0037639 | A1 | * | 2/2012 | Gotsis | A47J 45/071 |
| | | | | | 220/573.4 |
| 2013/0233863 | A1 | * | 9/2013 | Lapine | B32B 1/08 |
| | | | | | 220/573.1 |
| 2017/0208650 | A1 | * | 7/2017 | Davis | F24C 15/26 |
| 2018/0360263 | A1 | * | 12/2018 | Ebbeke | A47J 36/02 |
| 2019/0069353 | A1 | * | 2/2019 | Hall | H05B 6/1227 |

* cited by examiner

*Primary Examiner* — Paul T Chin
(74) *Attorney, Agent, or Firm* — Bruce A. Lev

(57) ABSTRACT

Electric cooking utensils that are adapted to be electrically heated to further the cooking process by contacting and heating food while the food is being manipulating by the utensil. In particular, an electrically heated spatula is adapted to transfer additional heat to a food item being cooked while being manipulated by the utensil and thereby expediting and improving the cooking process.

18 Claims, 3 Drawing Sheets

ELECTRIC COOKING UTENSILS

CROSS-REFERENCE TO RELATED APPLICATION

The present application is related to and claims priority from provisional application Ser. No. 63/079,519, filed Sep. 17, 2020 which is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

1. Field of the Invention

The present invention relates generally to the field of electrically heated cooking utensils, and more specifically an electrically heated spatula.

2. Description of the Related Art

Prior cooking utensils are non-electric, non-heated and mainly used to simply manipulate food and other items while being cooked and prepared for ingestion. This can be a slow process and possibly leave portions of the food as uncooked and unhealthy to eat. And, none of the prior art designs are adapted to further the cooking process while manipulating the food.

Thus, a need exists for electric cooking utensils that are design to be electrically heated to further the cooking process by contacting and heating food while being manipulating by the utensil to avoid the above-mentioned problems.

BRIEF SUMMARY OF THE INVENTION

In view of the foregoing disadvantages inherent in known cooking utensils, the present invention provides novel cooking utensils that are design to be electrically heated to further the cooking process by contacting and heating food while being manipulating by the utensil. In particular, an electrically heated spatula would transfer additional heat to a food item being cooked and thereby expedite and improve the cooking process.

The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, Electric Cooking Utensils, constructed and operative according to the teachings of the present invention.

The various embodiments of the present invention will hereinafter be described in conjunction with the appended drawings.

DETAILED DESCRIPTION

As discussed above, embodiments of the present invention provide novel cooking utensils that are design to be electrically heated to further the cooking process by contacting and heating food while the food is being manipulating by the utensil. In particular, an electrically heated spatula would transfer additional heat to a food item being cooked while being manipulating by the utensil and thereby expedite and improve the cooking process.

Figure 1:
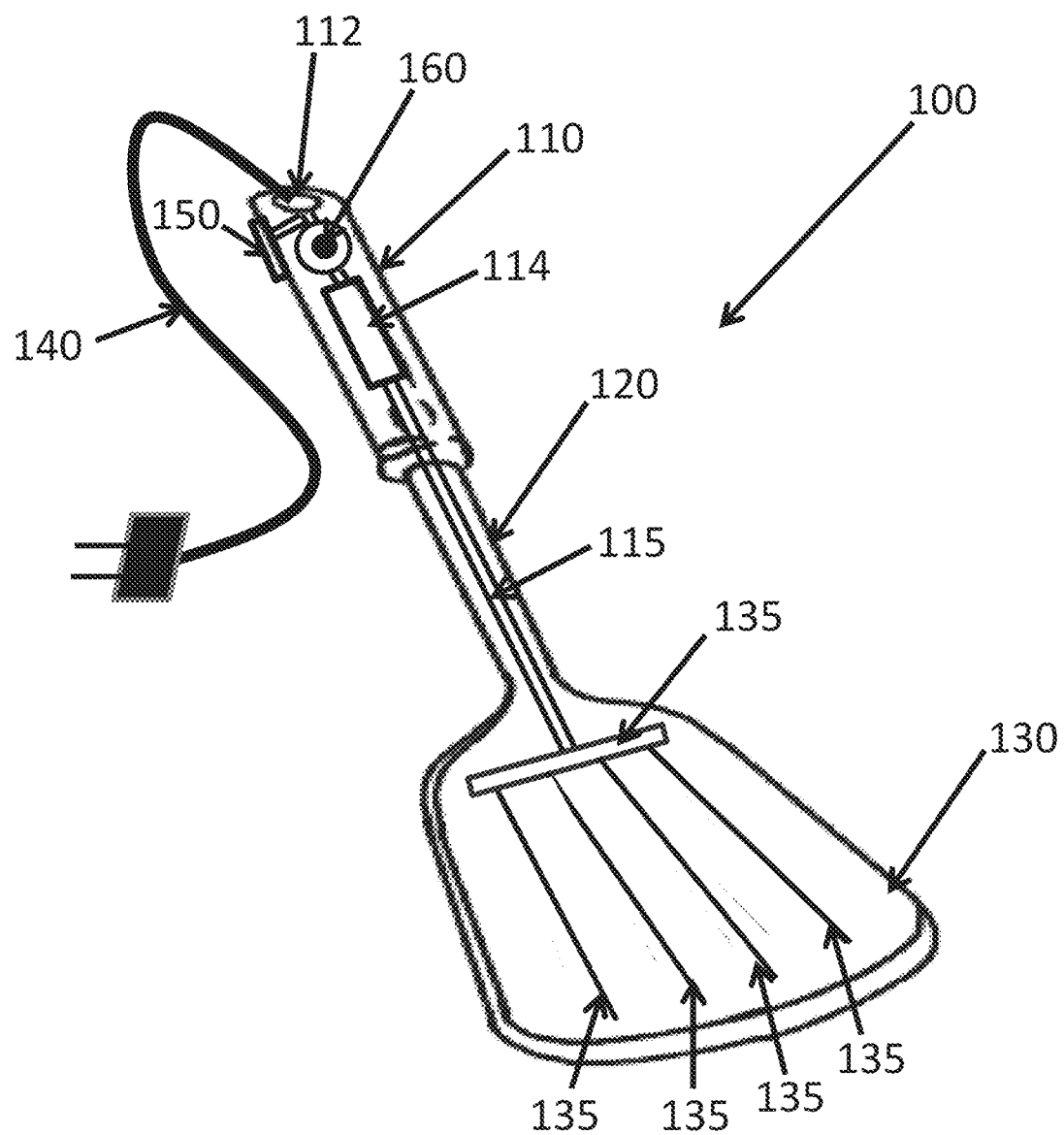
FIG. 1 shows a perspective view illustrating Electric Cooking Utensils, specifically an electrically heated spatula, according to an embodiment of the present invention.

Referring now to the drawings FIG. 1, the preferred embodiment of the electrically heated utensil is formed as an electric spatula 100 having a handle portion 110 a shaft portion 120 and a blade portion 130. The handle portion 110 includes an electric plug 112 adapted releasably and electrically connect with an electrical cord 140 that is adapted to releasably connect with an external power supply. The handle portion 110 further includes a rechargeable battery 114 connected to the electric plug 112. The shaft portion 120 is connected to the handle portion 110 at a proximal end thereof and to the blade portion 130 at a distal end thereof. The shaft portion 120 is hollow and is adapted to house electric wires 115 therethrough. The blade portion 130 is formed from a heat conducting material that can be formed as being rigid or flexible, and is connected to the distal end of the shaft portion 120. Electric wires 115 are used and connected between the electric plug 112, and/or the rechargeable battery 114, and the blade portion 130. The blade portion 130 may include heat generator elements 135, usually formed as resistors, to more evenly distribute the electrical current throughout the outer surfaces of the blade portion 130. The blade portion 130 may also include heat intensity nodules 137 embedded therein that may be formed from a different heat conducting material from the rest of the blade and are adapted to heat up to a different temperature than the rest of the blade's heat conducting material and thereby cook food material unevenly for differing desired textures and tastes.

Figure 2:
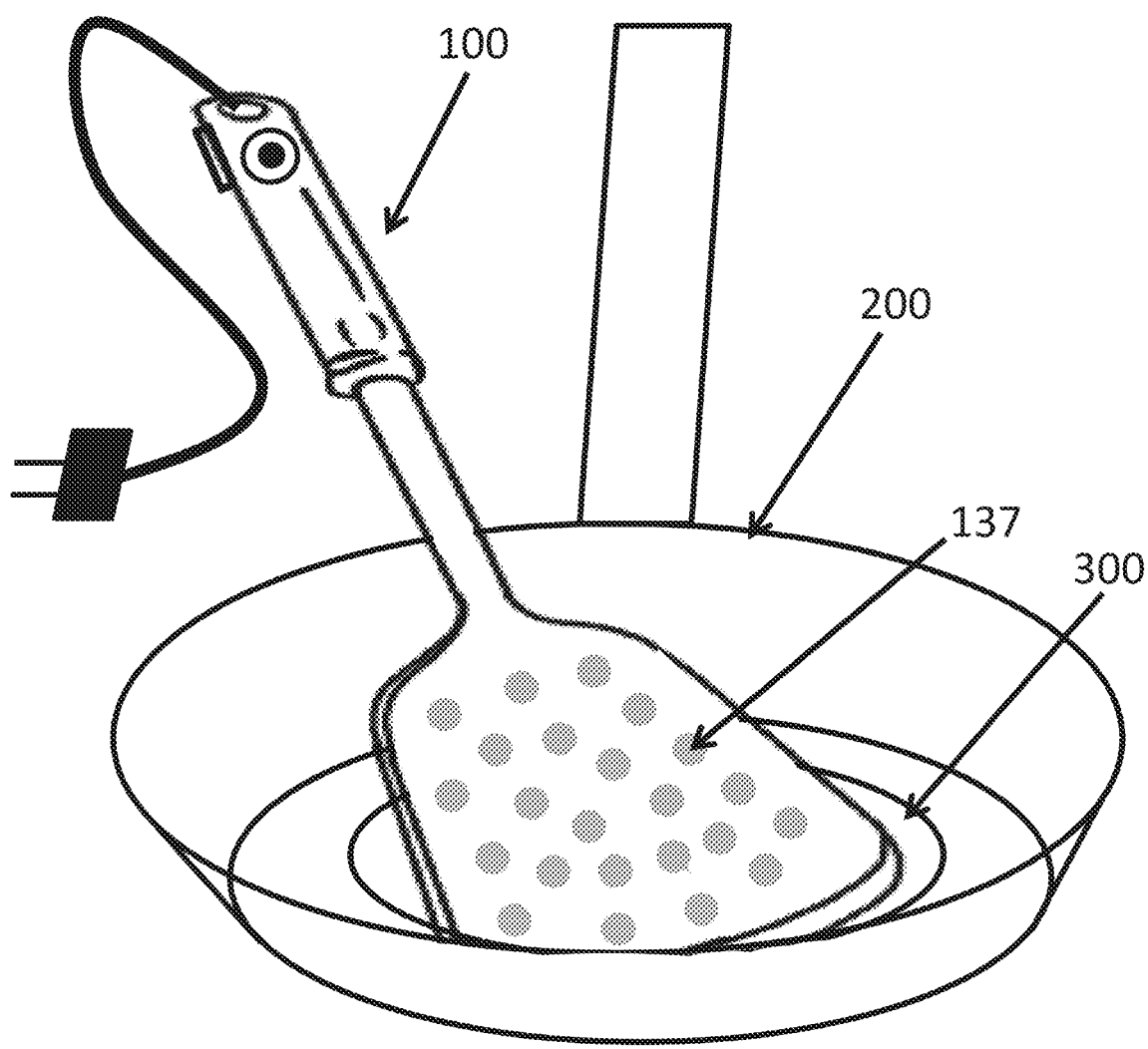
FIG. 2 shows a perspective view illustrating Electric Cooking Utensils, specifically an electrically heated spatula, in combination with a frying pan according to the embodiment of the present invention of FIG. 1.
Figure 3:
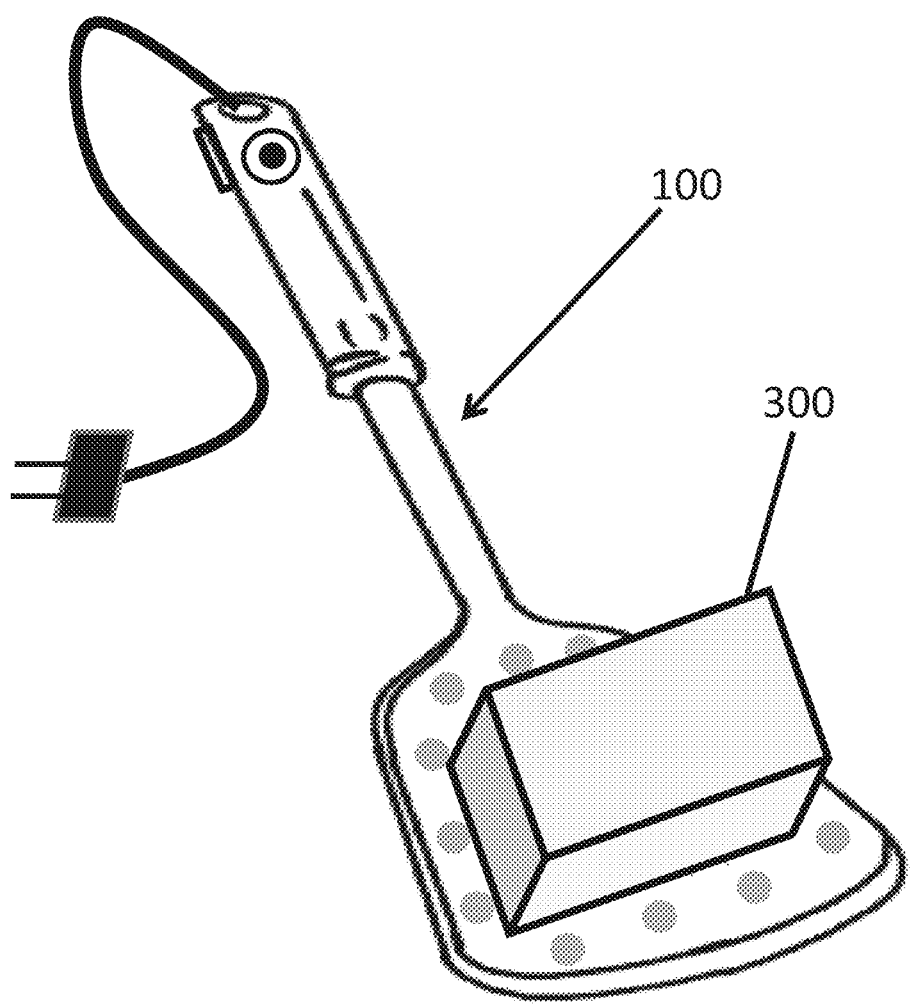
FIG. 3 shows a perspective view illustrating Electric Cooking Utensils, specifically an electrically heated spatula, being used to hold and cook food material according to the embodiment of the present invention of FIG. 1.

In use, as shown in FIG. 2, the electrical current from the electric plug 112 and/or the rechargeable battery 114 is transferred to the blade portion 130. The conductive material of the blade portion 130 is then heated by the electric current and is then placed and pushed against a surface of the food material 300 being cooked until the desired amount of cooking is achieved. The electric spatula can be used in combination with a traditional method of cooking, ie, a frying pan 200, or can be used as an individual cooking/heating source as shown in FIG. 3.

The handle portion 110 may further include an on/off switch 150 and a potentiometer 160 connected between the electric plug 112, and/or the rechargeable battery 114, and the blade portion 130 that allows for adjusting the amount of electricity passing through from the electric plug 112 and/or the rechargeable battery 114 to the blade portion 130, and thereby can control the amount of heat emanating from the blade portion 130.

The handle portion 110 may be formed from an insulating material adapted to protect a user from the electric currents being passed therethrough and the heat generated within the blade portion 130. The shaft portion 120 may also be formed from an insulating material adapted to protect a user from the electric currents being passed therethrough and the heat generated within the blade portion 130.

Materials that can be used to form the blade portion 130 include aluminum, copper, ceramic, stainless steel, cast iron, anodized aluminum, and combinations thereof. The blade portion 130 may be formed having a shape chosen from a list of shape including a flat rectangle, a wedge shape, a circular shape, and an undulated shape, and even include apertures therethrough formed having a shape chosen from a list of shapes including cylindrical, rectangular, elongated rectangles, star-shaped, etc. The heat intensity nodules 137 of the blade portion may also be formed from aluminum, copper, ceramic, stainless steel, cast iron, anodized aluminum, and combinations thereof. And, when the choice of materials of the heat intensity nodules 137 differs from the material of the rest of the blade portion 130 different portions of the food material can be cooked to different temperatures and thereby results in differing tastes and textures throughout the food material. The heat intensity nodules 137 may also be located such that different patterns and shapes can be formed thereon, including a star, a smiley face, a four-leaf clover, and even logos and trademarks. As such, these patterns and shapes can be transferred, ie., burned upon, seared, branded, to the outer layer of the material being cooked.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is:

1. An electric spatula comprising:
   a spatula handle portion including:
      an electric plug;
         wherein said electric plug is adapted releasably and electrically connect with an electrical cord that is adapted to releasably connect with an external power supply;
      a spatula shaft portion;
         wherein said spatula shaft portion is connected to said spatula handle portion at a proximal end thereof;
      a spatula blade portion including:
         a top surface; and
         a bottom surface;
         wherein said spatula blade portion is connected to a distal end of said spatula shaft portion; and
         wherein said spatula blade portion is formed from a heat conducting material;
      a plurality of heat intensity nodules;
         wherein said plurality of heat intensity nodules are embedded and spaced from one another within said heat conducting material of said spatula blade portion, are formed from a different heat conducting material than said heat conducting material of said spatula blade portion, and are adapted to heat up to a different temperature than said heat conducting material of said spatula blade portion and thereby cook food material unevenly for differing desired textures and tastes; and
      at least one electrical wire;
         wherein said at least one electrical wire is connected between said electric plug and said spatula blade portion, extends along the length of said spatula shaft portion, and is adapted to transfer electric power from said electric plug to said spatula blade portion and said plurality of heat intensity nodules, such that said spatula blade portion and said plurality of heat intensity nodules can rise in temperature;
      wherein said spatula blade portion and said plurality of heat intensity nodules of said electric spatula are adapted to heat up to different temperatures, contact, and thereby cook said food material unevenly when in contact therewith.

2. The electric cooking utensil of claim 1, wherein said spatula handle portion further includes a rechargeable battery connected between said electric plug and said at least one electrical wire.

3. The electric cooking utensil of claim 2, wherein said spatula handle portion further includes:
   an on/off switch;
      wherein said on/off switch is electrically connected between said electric plug and said rechargeable battery and said at least one electrical wire; and
   a potentiometer
      wherein said potentiometer is electrically connected between said on/off switch and said rechargeable battery and said at least one electrical wire, and adapted to adjust the amount of electricity passing through from said electric plug to said spatula blade portion and said plurality of heat intensity nodules, and thereby adapted to control the amount of heat emanating from said spatula blade portion and said plurality of heat intensity nodules.

4. The electric cooking utensil of claim 1, wherein said spatula blade portion further includes:
   heat generator elements;
      wherein said heat generator elements are electrically connected to said at least one electrical wire and are adapted to distribute electrical current to said top and bottom surfaces of said spatula blade portion and to said plurality of heat intensity nodules.

5. The electric cooking utensil of claim 4, wherein said heat generator elements are formed as resistors.

6. The electric cooking utensil of claim 1, wherein said spatula handle portion is formed from an insulating material adapted to protect a user from electric currents being passed therethrough and from heat generated within said spatula blade portion.

7. The electric cooking utensil of claim 6, wherein said spatula shaft portion is formed from an insulating material adapted to protect a user from electric currents being passed therethrough and from heat generated within said spatula blade portion.

8. The electric cooking utensil of claim 1, wherein said spatula blade portion is formed from a material chosen from a group of materials consisting of aluminum, copper, ceramic, stainless steel, cast iron, anodized aluminum, and combinations thereof.

9. The electric cooking utensil of claim 8, wherein said plurality of heat intensity nodules are formed from a material chosen from a group of materials consisting of aluminum, copper, ceramic, stainless steel, cast iron, anodized aluminum, and combinations thereof; and wherein said material chosen for said plurality of heat intensity nodules differs from said material chosen for said spatula blade portion, such that different portions of said food material being cooked by said electric cooking utensil are cooked at different temperatures and thereby results in differing tastes and textures throughout said food material.

10. The electric cooking utensil of claim 1, wherein said spatula blade portion is formed having a shape chosen from a group of shapes consisting of a flat rectangle, a wedge shape, a circular shape, and an undulated shape.

11. The electric cooking utensil of claim 1, wherein said spatula blade portion further includes apertures therethrough formed having a shape chosen from a list of shapes consisting of cylindrical, rectangular, and elongated rectangles.

12. The electric cooking utensil of claim 1, further comprising an electric cord adapted to releasably connect between said electric plug of said spatula handle portion and an external power supply.

13. A combination of a frying pan and an electric spatula, said combination comprising:
a frying pan including:
 a pan including:
  a cooking surface;
   wherein said cooking surface is adapted to hold and cook food material thereon;
   wherein said pan is formed from a material adapted to transfer heat therethrough; and
  a handle;
   wherein said handle is attached to and extends from said pan; and
an electric spatula comprising:
 a spatula handle portion including:
  an electric plug;
   wherein said electric plug is adapted releasably and electrically connect with an electrical cord that is adapted to releasably connect with an external power supply;
 a spatula shaft portion;
   wherein said spatula shaft portion is connected to said spatula handle portion at a proximal end thereof;
 a spatula blade portion including:
  a top surface; and
  a bottom surface;
   wherein said spatula blade portion is connected to a distal end of said spatula shaft portion; and
   wherein said spatula blade portion is formed from a heat conducting material;
 a plurality of heat intensity nodules;
   wherein said plurality of heat intensity nodules are embedded and spaced from one another within said heat conducting material of said spatula blade portion, are formed from a different heat conducting material than said heat conducting material of said spatula blade portion, and are adapted to heat up to a different temperature than said heat conducting material of said spatula blade portion and thereby cook food material unevenly for differing desired textures and tastes; and
 at least one electrical wire;
   wherein said at least one electrical wire is connected between said electric plug and said spatula blade portion, extends along the length of said spatula shaft portion, and is adapted to transfer electric power from said electric plug to said spatula blade portion and said plurality of heat intensity nodules, such that said spatula blade portion and said plurality of heat intensity nodules can rise in temperature;
wherein said frying pan is used in combination with said electric spatula such that said food material can be placed upon and cooked upon said cooking surface of said pan of said frying pan and simultaneously cooked by said frying pan and said spatula blade portion and said plurality of heat intensity nodules of said electric spatula, such that said food material is pressed between said frying pan and said electric spatula and cooked unevenly from top and bottom surfaces thereof.

14. The combination of claim 13, wherein said spatula blade portion further includes:
heat generator elements;
 wherein said heat generator elements are electrically connected to said at least one electrical wire and are adapted to distribute electrical current to said top and bottom surfaces of said spatula blade portion and said plurality of heat intensity nodules.

15. The combination of claim 13, wherein said plurality of heat intensity nodules are formed from a material chosen from a group of materials consisting of aluminum, copper, ceramic, stainless steel, cast iron, anodized aluminum, and combinations thereof; and wherein said material chosen for said plurality of heat intensity nodules differs from said material chosen for said spatula blade portion, such that different portions of said food material being cooked by said electric spatula are cooked at different temperatures and thereby results in differing tastes and textures throughout said food material.

16. The combination of claim 13, wherein said spatula handle portion further includes:
an on/off switch;
 wherein said on/off switch is electrically connected between said electric plug and said rechargeable battery and said at least one electrical wire; and
a potentiometer
 wherein said potentiometer is electrically connected between said on/off switch and said rechargeable battery and said at least one electrical wire, and adapted to adjust the amount of electricity passing through from said electric plug to said spatula blade portion, and thereby adapted to control the amount of heat emanating from said spatula blade portion and said plurality of heat intensity nodules.

17. The combination of claim 13, further comprising an electric cord adapted to releasably connect between said electric plug of said spatula handle portion and an external power supply.

18. The combination of claim 13, wherein said spatula handle portion further includes a rechargeable battery connected between said electric plug and said at least one electrical wire.

* * * * *